(12) United States Patent
Sano et al.

(10) Patent No.: US 7,960,521 B2
(45) Date of Patent: Jun. 14, 2011

(54) AZO DYES, COMPOSITIONS FOR ANISOTROPIC DYE FILMS USING THEM, ANISOTROPIC DYE FILMS AND POLARIZING ELEMENTS

(75) Inventors: Hideo Sano, Yokohama (JP); Masami Kadowaki, Yokohama (JP); Ryuichi Hasegawa, Yokohama (JP); Wataru Shimizu, Yokohama (JP)

(73) Assignee: Mitsubishi Chemical Corporation, Tokyo (JP)

( * ) Notice: Subject to any disclaimer, the term of this patent is extended or adjusted under 35 U.S.C. 154(b) by 946 days.

(21) Appl. No.: 11/721,986

(22) PCT Filed: Dec. 14, 2005

(86) PCT No.: PCT/JP2005/022969
§ 371 (c)(1),
(2), (4) Date: Jun. 18, 2007

(87) PCT Pub. No.: WO2006/064852
PCT Pub. Date: Jun. 22, 2006

(65) Prior Publication Data
US 2009/0267031 A1 Oct. 29, 2009

(30) Foreign Application Priority Data

Dec. 16, 2004 (JP) ................. 2004-364469
Nov. 24, 2005 (JP) ................. 2005-338108

(51) Int. Cl.
C09B 31/20 (2006.01)
C09B 31/22 (2006.01)
G02B 5/30 (2006.01)
(52) U.S. Cl. .................................................. 534/815
(58) Field of Classification Search .................. None
See application file for complete search history.

(56) References Cited

U.S. PATENT DOCUMENTS

| | | | |
|---|---|---|---|
| 3,943,122 A | 3/1976 | Sailer et al. | |
| 7,031,053 B2 * | 4/2006 | Bobrov et al. | 359/352 |
| 7,527,862 B2 * | 5/2009 | Yoneyama et al. | 428/411.1 |
| 7,530,685 B2 * | 5/2009 | Devonald | 347/100 |

FOREIGN PATENT DOCUMENTS

| | | |
|---|---|---|
| JP | 3 78703 | 4/1991 |
| JP | 2002 180052 | 6/2002 |
| JP | 2002 528758 | 9/2002 |
| JP | 2003-292808 | * 10/2003 |
| WO | WO 94/28073 | * 12/1994 |
| WO | WO 2004/046252 | * 6/2004 |

OTHER PUBLICATIONS

Derwent Abstract of JP 2003-292808, Oct. 15, 2003, Derwent Acc. No. 2004-286188.*
Ignatov L., et al., "Thin Crystal Film Optical Components", Proceeding of SPIE, 4459, 148-154, 2002.*
Dreyer, "The fixing of Molecular Orientation", J.F. Phys. and colloid chem., vol. 52, pp. 808-810, 1948.
U.S. Appl. No. 11/722,924, filed Jun. 27, 2007, Sano, et al.
U.S. Appl. No. 11/910,687, filed Oct. 4, 2007, Sano, et al.

* cited by examiner

Primary Examiner — Fiona T Powers
(74) Attorney, Agent, or Firm — Oblon, Spivak, McClelland, Maier & Neustadt, L.L.P.

(57) ABSTRACT

To provide a dye capable of forming an anisotropic dye film showing high dichroism and having a high degree of molecular orientation, a composition containing the dye, an anisotropic dye film using the dye and a polarizing element.

A trisazo dye, of which the free acid form is represented by the following formula (1), wherein at least one of $B^1$ and $D^1$ has at least one substituent as defined by the following Q1, a dye composition for an anisotropic dye film containing the dye, an anisotropic dye film and a polarizing element using the anisotropic dye film:

Q1: an alkyl group or alkoxy group substituted by a hydrogen bond-forming group:

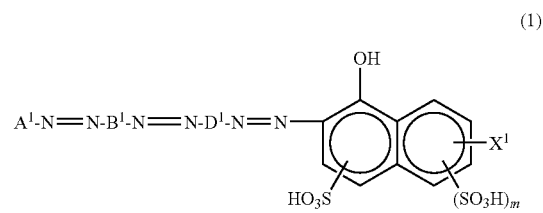

(1)

wherein $A^1$ is a phenyl group or a naphthyl group, each of $B^1$ and $D^1$ is a phenylene group or a naphthylene group, $X^1$ is an amino group which may be substituted or a hydroxyl group, and m is 0 or 1.

9 Claims, 7 Drawing Sheets

AZO DYES, COMPOSITIONS FOR ANISOTROPIC DYE FILMS USING THEM, ANISOTROPIC DYE FILMS AND POLARIZING ELEMENTS

TECHNICAL FIELD

The present invention relates to azo dyes anisotropic dye films using the dyes and the like. Particularly it relates to azo dyes suitable for anisotropic dye films to be formed by a wet system film-forming method, particularly trisazo dyes showing high dichroism, which are useful for anisotropic dye films for e.g. polarizing plates provided on display devices such as light controlling devices liquid crystal devices is (LCD) and organic electroluminescence devices (OLED), and compositions for anisotropic dye films using them anisotropic dye films and polarizing elements.

BACKGROUND ART

In LCD, linear polarizing plates or circular polarizing plates are used to control optical rotation or birefringence in display. Also in OLED, circular polarizing plates are used to prevent reflection of outside light. Heretofore, for such polarizing plates (polarizing elements), iodine has been widely used as a dichroic material. However, if iodine is used for a polarizing film, its heat resistance or light fastness is inadequate since iodine is highly sublimable. Further, the extinction color becomes dark grayish blue, and an ideal achromatic color polarizing plate for the entire visible spectral region cannot necessarily be obtained.

Therefore, an anisotropic dye film as a polarizing film has been studied wherein an organic dye is used as a dichroic material which replaces iodine. However, such an organic dye has a problem such that only polarizing elements are obtainable which are substantially inferior in dichroism as compared with ones employing iodine.

Particularly, a polarizing element is an important constituent in LCD employing as the display principle optical rotation or birefringence of light, and a new polarizing element has been developed for the purpose of improving display performance and the like in recent years.

As one method of forming an anisotropic dye film to be used for such a polarizing element, a method may be mentioned wherein, in the same manner as in the case of a polarizing film containing iodine, an organic dye having dichroism (dichroic dye) is resolved or adsorbed in a polymer material such as a polyvinyl alcohol, and the obtained film is stretched in one direction into a film so that the dichroic dye is oriented.

Further, Non-Patent Document 1 discloses a method of orientating a dichroic dye on a substrate such as glass or a transparent film utilizing e.g. intermolecular interaction of organic dye molecules.

The method of orienting a dichroic dye on a substrate such as glass or a transparent film utilizing e.g. intermolecular interaction of organic dye molecules to prepare an anisotropic dye film, may be a wet system film-forming method. In a case where an anisotropic dye film is prepared by the wet system film-forming method, the dye molecules to be used for the dye film are required not only to show high dichroism but also to be a dye suitable for the process for the wet system film-forming method.

Further, Patent Documents 1 to 3 propose materials suitable for the process of the wet system film-forming method. However, although such materials are suitable is for the process, they have had such a drawback that they cannot show high dichroism.

Non-Patent Document 1: Dreyer, J. F., Phys. And Colloid Chem. 1948, 52, 808., "The Fixing of Molecular Orientation"
Patent Document 1: JP-A-2002-180052
Patent Document 2: JP-A-2002-528758
Patent Document 3: JP-A-3-78703

DISCLOSURE OF THE INVENTION

Problems that the Invention is to Solve

It is an object of the present invention to provide a trisazo dye capable of forming an anisotropic dye film showing high dichroism and having a high degree of molecular orientation (order parameter). Particularly, it is an object to provide a trisazo dye suitable for formation of an anisotropic dye film by a wet system film-forming method, an anisotropic dye film using the dye, and the like.

Means of Solving the Problems

The present inventors have conducted extensive studies to achieve the above objects and as a results, found that an anisotropic dye film formed by a wet system film-forming method using a trisazo dye represented by the following formula (1) wherein at least one of groups represented by $B^1$ and $D^1$ has at least one specific substituent i.e. an alkyl group or alkoxy group substituted by a hydrogen bond-forming group, shows high dichroism and has a high degree of molecular orientation. The present invention has been accomplished on the basis of this discovery.

Namely, the present invention provides the following:

1. A trisazo dye, of which the free acid form is represented by the following formula (1), wherein at least one of groups represented by $B^1$ and $D^1$ has at least one substituent as defined by Q1: an alkyl group or alkoxy group substituted by a hydrogen bond-forming group:

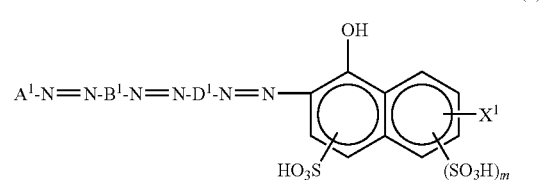

(1)

wherein $A^1$ is a phenyl group or naphthyl group which may be substituted, each of $B^1$ and $D^1$ which are independent of each other, is a phenylene group or naphthylene group which may be substituted, and may have a substituent other than Q1, $X^1$ is an amino group which may be substituted or a hydroxyl group, and m is 0 or 1.

2. The trisazo dye according to the above 1, wherein in the above formula (1), the substituent represented by Q1 is Q2: an alkyl group or alkoxy group substituted by a —OH group, a —COOH group, a —$NR^1R^2$ group, a —$SO_2NR^3R^4$ group or a —$CONR^5R^6$ group, wherein each of $R^1$ to $R^6$ which are independent of one another, is a hydrogen atom or a $C_{1-6}$ alkyl group which may be substituted.

3. The trisazo dye according to the above 1 or 2, wherein in the formula (1), each of the groups represented by $B^1$ and $D^1$ which are independent of each other, is a group represented by the following formula (a) or (b):

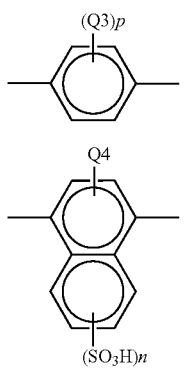

(a)

(b)

wherein each of Q3 and Q4 which are independent of each other, is a substituent as defined by the above Q1, p is 1 or 2, and n is 0 or 1.

4. The trisazo dye according to any one of the above 1 to 3, wherein in the above formula (1), the group represented by $A^1$ is a group represented by the following formula (c):

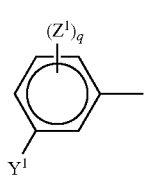

(c)

wherein $Y^1$ is a sulfo group, a carboxy group or a phosphoric acid group, $Z^1$ is a halogen atom, a hydroxyl group, a nitro group, a cyano group, an amino group which may be substituted, a $C_{1-4}$ alkyl group which may be substituted, a $C_{1-4}$ alkoxy group which may be substituted, a sulfo group or a carboxy group, and q is 0 or 1.

5. A composition for an anisotropic dye film, which contains the trisazo dye as defined in any one of the above 1 to 4 and a solvent.

6. An anisotropic dye film, which contains the trisazo dye as defined in any one of the above 1 to 4.

7. The anisotropic dye film according to the above 6, which is formed by using the composition for an anisotropic dye film as defined in the above 5.

8. A polarizing element using the anisotropic dye film as defined in the above 6 or 7.

EFFECTS OF THE INVENTION

The trisazo dye represented by the above formula (1) of the present invention is a dye which is likely to show lyotropic liquid crystal properties by self-assembly and is thereby excellent in dichroism.

Further, when an anisotropic dye film is prepared by using the trisazo dye of the present invention an anisotropic dye film showing dichroism with small wavelength dispersion properties and having a high degree of molecular orientation can be obtained, and further, a polarizing element using such an anisotropic dye film is excellent in contrast.

BEST MODE FOR CARRYING OUT THE INVENTION

Figure 1:
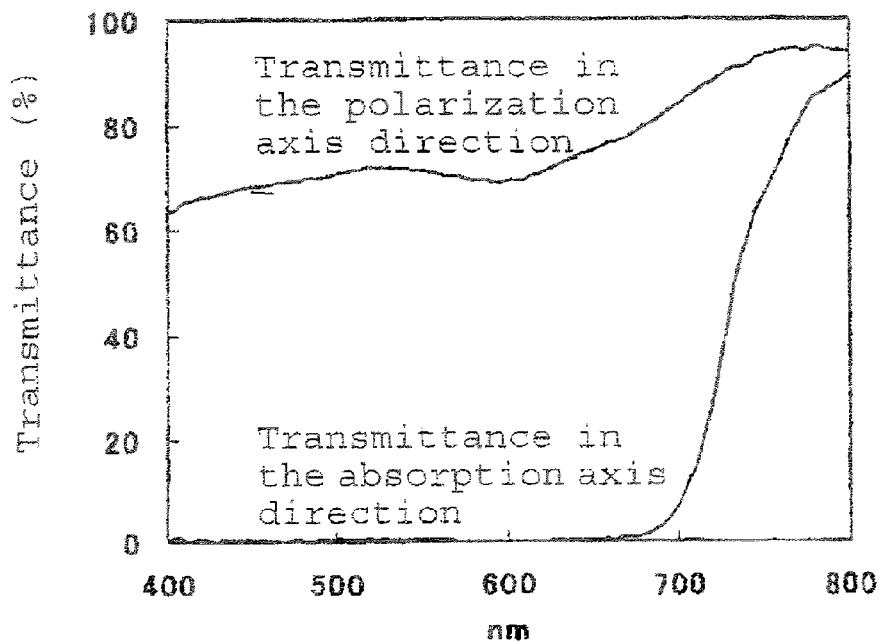
FIG. 1 shows the transmittance (Tz) of an anisotropic dye film in Example 1 for a polarized light in the absorption axis direction and the transmittance (Ty) for a polarized light in the polarization axis direction in the plane of the film.

Now, constituting elements of the present invention will be described in detail below, but it should be understood that the following description of the constituting elements are merely exemplary (typical examples) of practical embodiments of the present invention and the present invention is by no means is thereby restricted.

The anisotropic dye film in the present invention is a dye film having anisotropy in an electromagnetic characteristic in optional two directions selected from a total of three directions in a three-dimensional coordinate system comprising the thickness direction of the dye film and mutually perpendicular optional two in-plane directions. The electromagnetic characteristic may, for example, be an optical characteristic such as absorption or refraction, or an electric characteristic such as resistance or capacitance. As a film having an optical anisotropy in e.g. absorption or refraction, a linearly polarizing film, a circularly polarizing film, a phase difference film or an anisotropic electroconductive film may, for example, be mentioned. The dye of the present invention is particularly preferably employed for a polarizing film such as a linearly polarizing film or a circularly polarizing film.

The dye of the present invention is a trisazo dyes of which the free acid form is represented by the following formula (1), and is characterized in that it has a basic skeleton having a trisazo structure and having a naphthyl group substituted by a hydroxyl group, a sulfo group and the like at its terminal, and that at least one of groups represented by $B^1$ and $D^1$ in the basic skeleton has at least one substituent as represented by the following Q1 which enhances self-assembly of dye molecules:

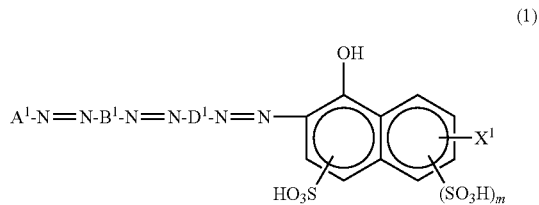

(1)

Q1: an alkyl group or alkoxy group substituted by a hydrogen bond-forming group.

The alkyl group or alkoxy group as Q1 may further have a substituent. In the above formula (1) the group represented by $A^1$ is a phenyl group or naphthyl group which may be substituted.

Each of groups represented by $B^1$ and $D^1$ which are independent of each other, is a phenylene group or naphthylene group which may be substituted, and may have a substituent other than Q1.

$X^1$ is an amino group which may be substituted or a hydroxyl group. m is 0 or 1.

The trisazo dye represented by the above formula (1) of the present invention has a specific substituent as defined by Q1 as mentioned above, and this specific substituent i.e. an alkyl group or alkoxy group substituted by a hydrogen bond-forming group has a property to develop an intermolecular interaction. Accordingly, the dye is estimated to be such that the dye molecules are likely to undergo self-assembly, whereby the dye is likely to show lyotropic liquid crystal properties. Accordingly, it is estimated that an anisotropic dye film showing high dichroism and having a is high degree of molecular orientation will be obtained by forming an anisotropic dye film employing a dye having such characteristics.

Accordingly, the dye of the present invention is useful as a dye for an anisotropic dye film, and an anisotropic dye film using such a dye is preferably used for a polarizing film, a phase difference film or an anisotropic electroconductive film, more preferably for a polarizing film.

Now, the trisazo dye of the present invention represented by the above formula (1) will be explained in detail below. In the present invention, "which may be substituted" means "which may have one or more substituents".

Groups Represented by $B^1$ and $D^1$

Each of groups represented by $B^1$ and $D^1$ hereinafter referred to as $B^1$ and $D^1$) which are independent of each other, is a phenylene group or naphthylene group which may be substituted and it is required that at least one of $B^1$ and $D^1$ has a substituent as defined by the following Q1.

Q1 is an alkyl group or alkoxy group substituted by a hydrogen bond-forming group.

The hydrogen bond is a bond formed by the presence of a hydrogen atom between two atoms, and the hydrogen bond-forming group means a proton donating group or a proton accepting group. The hydrogen bond-forming group is preferably a group to develop the intermolecular interaction, and specifically it is preferably a substituent as defined by the following Q2.

Q2: an alkyl group or alkoxy group substituted by a —OH group a —COOH group, a —$N^1R^2$ group, a —$SO_2NR^3R^4$ group or a —$CONR^5R^6$ group.

Each of $R^1$ to $R^6$ which are independent of one another is a hydrogen atom or a $C_{1-6}$ alkyl group which may be substituted. The substituent of the alkyl group may, for example, be a hydroxyl group, an amino group or a carboxy group.

Each of the alkyl group and the alkoxy group as the substituent Q1 has preferably at least 1 and at most 6 carbon atoms, more preferably at least 1 and at most 3 carbon atoms. Specifically, the alkyl group may be a lower alkyl group such as a methyl group, an ethyl group, a n-propyl group or a n-butyl group, and the alkoxy group may be a lower alkoxy group such as a methoxy group, an ethoxy group, a n-propoxy group or a n-butoxy group.

Each of the alkyl group and the alkoxy group has to be substituted by at least one hydrogen bond-forming group, and it may be substituted by two or more hydrogen bond-forming groups, but it is substituted usually by at least one and at most two hydrogen bond-forming groups. $R^1$ and $R^6$ are as defined above.

The total number of carbon atoms in the substituent Q1 is preferably at least 1 and at most 10, more preferably at least 1 and at most 6. If the number of carbon atoms is more than the upper limit, the solubility may decrease.

Specifically the alkyl group or alkoxy group substituted by a hydrogen bond-forming group may, for example, be a hydroxy-substituted alkyl group or alkoxy group such as a 2-hydroxyethyl group, a 2-hydroxyethoxy group or a 2,3-dihydroxypropoxy group; a carboxy-substituted alkyl group or alkoxy group such as a 2-carboxyethyl group, a carboxy ethoxy group or a 2-carboxyethoxy group; an amino-substituted alkyl group or alkoxy group such as a 2-aminoethyl group, an aminomethyl group or a 2-aminoethoxy group; a (substituted) sulfamoyl-substituted alkyl group or alkoxy group such as a 2-sulfamoylethyl group or a 2-sulfamoylethoxy group; or an alkyl group or alkoxy group substituted by a (substituted) carbamoyl group such as a 2-carbamoylethyl group, a carbamoylmethoxy group or a 2-[2,3-dihydroxyethyl aminocarbonyl]ethoxy group.

The alkyl group or alkoxy group may have another substituent in addition to the hydrogen bond-forming group within a range not to impair the performance of the present invention.

Both of $B^1$ and $D^1$ may have the substituent Q1 or only one of $B^1$ and $D^1$ may have the substituent Q1. In such a case, one substituent Q1 has to be present in either $B^1$ or $D^1$, and it is preferred that one or more substituents Q1 are present in each of $B^1$ and $D^1$. Further, the number of the substituent Q1 which can be present in each of $B^1$ and $D^1$ is 1 or 2, preferably 1.

In a case where $B^1$ or $D^1$ is a phenylene group, the phenylene group may have a substituent other than the above substituent Q1. The substituent other than Q1 is preferably a hydrophilic group to be introduced to increase the solubility in a solvent or an electron donative group or an electron withdrawing group to be introduced to adjust the chromaticness, such as a sulfo group, a carboxy group, an alkyl group which may be substituted (excluding a hydrogen bond-forming group), an alkoxy group which may be substituted (excluding a hydrogen bond-forming group) or an amino group which may be substituted.

Specifically, such an alkyl group, an alkoxy group and an amino group may, for example, be a $C_{1-4}$ alkyl group such as a methyl group, an ethyl group, a n-propyl group, an i-propyl group or a n-butyl group; a $C_{1-4}$ (substituted) alkoxy group such as a methoxy group, an ethoxy group, a n-propoxy group, an i-propoxy group or a n-butoxy group; an amino group; a $C_{1-8}$ alkylamino group such as a N-methylamino group, a N,N-dimethylamino group or a N,N-diethylamino group; an arylamino group such as a N-phenylamino group; or a $C_{2-8}$ acylamino group such as an acetylamino group or a benzoylamino group.

The above alkyl group, alkoxy group and amino group may further have a substituent, and such a substituent may, for example, be an alkoxy group or a halogen atom.

In a case where $B^1$ or $D^1$ is a phenylene group, another substituent which the phenylene group may have is preferably, among the above substituents, a sulfo group, a carboxy group, an alkyl group which may be substituted, an alkoxy group may be substituted or an acylamino group which may be substituted, and from the viewpoint of the intermolecular interaction and the chromaticness, particularly preferably a $C_{1-4}$ alkyl group, a $C_{1-4}$ alkoxy group or a $C_{2-8}$ acylamino group. In a case where $B^1$ or $D^1$ is a phenylene group, the total number of substituents including the above substituent Q1 and other substituents is preferably at least 1 and at most 3.

In a case where $B^1$ or $D^1$ is a naphthylene group, such a naphthylene group may have another substituent other than the substituent Q1. Such another substituent may be a group to adjust the solubility or the chromaticness, such as a hydroxyl group, a sulfo group or alkoxy group which may be substituted.

Specifically, the alkoxy group may, for example, be a $C_{1-4}$ alkoxy group such as a methoxy group or an ethoxy group.

In the naphthylene group as $B^1$ or $D^1$, the total number or the substituents including the above substituent Q1 and other substituents is preferably at least 1 and at most 6, more preferably at least 1 and at most 3. As another substituent which the naphthylene group may have is particularly preferably a sulfo group or an alkoxy group.

In the present invention each of $B^1$ and $D^1$ which are independent of each other, is more preferably represented by the following formula (a) or (b):

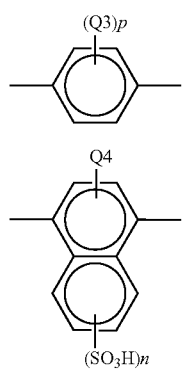

wherein each of Q3 and Q4 which are independent of each other, is the substituent as defined by the above Q1, p is 1 or 2, and n is 0 or 1.

By the basic skeleton represented by the formula (1) of the dye of the present invention having the 1,4-phenylene group or the 1,4-naphthylene group represented by the above formula (a) or (b), the linearity of the dye molecules can be maintained and the lyotropic liquid crystal properties can be developed.

One of $B^1$ and $D^1$ may be represented by the above formula (a) or (b) or both of $B^1$ and $D^1$ may be represented by the above formula (a) or (b).

Further, in the above formula (a), p is 1 or 2, but is preferably 1 so that the liquid crystal properties are likely to be developed Group Represented by $A^1$ In the above formula (1) the group represented by $A^1$ (hereinafter referred to as $A^1$) is a phenyl group or naphthyl group which may be substituted. The substituent which $A^1$ may have is not particularly limited so long as the performance of the dye of the present invention is not impaired.

In a case where $A^1$ is a phenyl group, the substituent which the phenyl group may have may be a hydrophilic group to be introduced to increase the solubility or an electron donative group or an electron withdrawing group to be introduced to adjust the chromaticness, such as a sulfo group, a carboxy group, a hydroxyl group, a nitro group, a cyano group, a phosphoric acid group, a halogen atom, an amino group which may be substituted, an alkyl group which may be substituted or an alkoxy group which may be substituted.

Specifically, such a halogen atom, and an amino group, an alkyl group and an alkoxy group which may be substituted as the substituent may, for example, be a halogen atom such as a fluorine atom, a chlorine atom, a bromine atom or an iodine atom; an amino group; an alkylamino group having usually at least 1 and at most 18 carbon atoms, preferably at least 1 and at most 8 carbon atoms, such as a N-methylamino group, a N,N-dimethylamino group or a N,N-diethylamino group; an arylamino group having usually at least 6 and at most 18 carbon atoms, preferably at least 6 and at most 10 carbon atoms, such as a N-phenylamino group or a N-naphthylamino group; an acylamino group having usually at least 2 and at most 18 carbon atoms, preferably at least 2 and at most 11 carbon atoms, such as an acetylamino group or a benzoylamino group; an alkyl group having usually at least 1 and at most 18 carbon atoms, preferably at least 1 and at most 12 carbon atoms, such as a methyl group, an ethyl group, a n-propyl group, an i-propyl group, a n-butyl group or a n-dodecyl group; or an alkoxy group having usually at least 1 and at most 18 carbon atoms, preferably at least 1 and at most 12 carbon atoms, such as a methoxy group, an ethoxy group, an i-propoxy group, n-butoxy group or a n-dodecyloxy group.

Each of the above amino group, alkyl group and alkoxy group may further have a substituent, and such a substituent may be a hydrophilic group such as a hydroxyl group or an alkoxy group.

In a case where $A^1$ is a phenyl group which may be substituted, the substituent which the phenyl group may have from the viewpoint of the solubility in a solvent and the chromaticness, is more preferably a hydrophilic group to be introduced to increase the solubility or an electron donative group or an electron withdrawing group to be introduced to adjust the chromaticness, such as a sulfo group, a carboxy group, a halogen atom, a cyan group, an amino group which may be substituted, an alkyl group which may be substituted or an alkoxy which may be substituted, particularly preferably a sulfo group, a carboxy group, a phosphoric acid group, a cyano group, an acylamino group or an alkyl group. The phenyl group as $A^1$ preferably has at least one and at most three substituents selected from these substituents.

In a case where $A^1$ is a naphthyl group, the substituent which the naphthyl group may have is preferably a hydrophilic group such as a sulfo group, a carboxy group or a hydroxyl group, and the naphthyl group as $A^1$ preferably has at least one and at most three substituents selected from these substituents. The substituent is advantageously a sulfo group in view of production and availability.

In the dye of the present invention, $A^1$ is particularly preferably a phenyl group represented by the following formula (c):

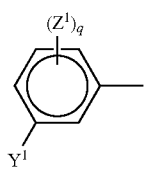

wherein $Y^1$ is a sulfo group a carboxyl group or a phosphoric acid group, $Z^1$ is a halogen atom, a hydroxyl group, a nitro group, a cyano group, a sulfo group, a carboxy group, an amino group which may be substituted, a $C_{1-4}$ alkyl group which may be substituted or a $C_{1-4}$ alkoxy group which may be substituted, and q is 0 or 1.

The dye of the present invention will have improved liquid crystal properties by $A^1$ being the phenyl group represented by the above formula (c) in the basic skeleton in the formula (1).

In the above formula (c), $Y^1$ is a water soluble group such as a carboxy group, a phosphoric acid group or a sulfo group, preferably a sulfo group or a carboxy group.

$Z^1$ is a halogen atom, a hydroxyl group, a nitro group, a cyano group, an amino group which may be substituted, an alkyl group which may be substituted, an alkoxy group which may be substituted, a carboxy group or a sulfo group, and such a substituent is an electron donative or electron withdrawing group to adjust the chromaticity or a substituent to adjust the solubility.

The substituent which the above amino group, alkyl group or alkoxy group as $Z^1$ may have may be one which will not impair the performance of the present invention, and the following may, for example, be mentioned.

A preferred substituent for the amino group may, for example, be an acyl group (more preferably an acyl group having at least 2 and at most 7 carbon atoms) such as an acetyl group or a benzoyl group; or an alkyl group (more preferably an alkyl group having at least 1 and at most 4 carbon atoms) which may be substituted, such as a methyl group, an ethyl group, a 2-hydroxyethyl group or a butyl group.

A preferred substituent which the alkyl group or the alkoxy group may have may, for example, be a hydroxyl group; an alkyl group (more preferably an alkyl group having at least 1 and at most 4 carbon atoms) such as a methyl group, an ethyl group or a butyl group; or an alkoxy group (more preferably an alkoxy group having at least 1 and at most 4 carbon atoms) such as a methoxy group, an ethoxy group or a butoxy group.

Specifically, $Z^1$ may, for example, be preferably a halogen atom such as a chlorine atom or a fluorine atom; a hydroxyl group; a nitro group; a cyano group; an amino group; a substituted amino group such as a N-methylamino group, a N,N-dimethylamino group, a N,N-diethylamino group a N-phenylamino group an acetylamino group or a benzoylamino group; an alkyl group, preferably an alkyl group having at least 1 and at most 4 carbon atoms, which may be substituted, such as a methyl group, an ethyl group, a n-butyl group or a 2-hydroxyethyl group; an alkoxy group, preferably an alkoxy group having at least 1 and at most 4 carbon atoms, which may be substituted, such as a methoxy group, an ethoxy group a hydroxyethoxy group a n-propoxy group, an i-propoxy group or a n-butoxy group.

Substituent for Terminal Naphthyl Group

The substituent $X^1$ which the terminal naphthyl group has is an amino group which may be substituted or a hydroxyl group. A preferred substituent for the amino group may, for example, be a $C_{1-4}$ alkyl group (such as a methyl group or an ethyl group) which may be substituted or a phenyl group which may be substituted. The substituent which the alkyl group or the phenyl group may have may be a water soluble group such as a hydroxyl group, a carboxy group or a sulfo group. Further the substitution position of $X^1$ is preferably the 6-position or the 7-position, particularly preferably the 7-position.

m representing the number of the sulfo group as the substituent is 0 or 1. In a case where m is 1, the substitution position of the sulfo group is preferably the 6-position.

The molecular weight of the dye represented by the above formula (1) of the present invention is usually at least 590 and at most 2,500, preferably at most 2,000 in the free acid form. If the molecular weight is too high exceeding this range, the solubility may decrease. If it is too low, the chromaticity tends to be hypsochromic. Further, the dye represented by the above formula (1) is usually water soluble, and usually shows dichroism. Among dyes of the present invention, one showing lyotropic liquid crystal properties in a solution is particularly preferred to obtain a dye film showing high anisotropy.

Further, the dye of the present invention and a composition containing the dye can provide a high degree of molecular orientation state by means of a process characteristic of the wet system film-forming method i.e. a lamination process by e.g. coating on the surface of a substrate. This means that it is possible to form a dye film with high anisotropy by using the dye of the present invention.

The dye to be used in the present invention may be used in its free acid form as represented by the above formula (1), or some of acidic groups may take a salt form. Further, a dye in a salt form and a dye in a free acid form may be present as mixed. Further, when it is obtained in a salt form at the time of its production, it may be used as it is or may be converted to a desired salt form. As a method for conversion to a salt form, a known method may optionally be employed. For example the following methods may be mentioned.

(1) A method wherein a strong acid such as hydrochloric acid is added to an aqueous solution of a dye obtained in a salt form, to let the dye precipitate in the form of a free acid, and then the acidic groups of the dye are neutralized with an alkali solution having a desired counter ion (such as a lithium hydroxide aqueous solution) for conversion to a salt.

(2) A method wherein a large excess amount of a neutral salt having a desired counter ion (such as lithium chloride) is added to an aqueous solution of a dye obtained in a salt form for conversion to a salt in the form of a salted out cake.

(3) A method wherein an aqueous solution of a dye obtained in a salt form is treated with a strongly acidic cation exchange resin to let the dye precipitate in the form of a free acid, and then the acidic groups of the dye are neutralized with an alkali solution having a desired counter ion (such as a lithium hydroxide aqueous solution) for conversion to a salt.

(4) A method wherein an aqueous solution of a dye obtained in a salt form is treated with a strongly acidic cation exchange resin preliminarily treated with an alkali solution having a desired counter ion (such as a lithium hydroxide aqueous solution), for conversion to a salt.

Further, with respect to the dye to be used in the present invention, whether the acidic group is in a free acid form or a salt form depends on the pKa (dissociation constant) of the acidic group of the dye and the pH of the aqueous dye solution.

The salt form may, for example, be a salt of an alkali metal such as Na, Li or K, a salt of ammonium which may be substituted by an alkyl group or a hydroxyalkyl group, or a salt of an organic amine. The organic amine may, for example, be a 1-6 lower alkylamine, a hydroxy-substituted $C_{1-6}$ lower alkylamine or a carboxy-substituted $C_{1-6}$ lower alkylamine. In the case of such a salt form, the type is not limited to one type, and a plural types may be present.

As specific examples of the dye represented by the formula (1) of the present invention in the free acid form dyes having structures represented by the following formulae (1-1) to (1-25) may be mentioned. However, the dye of the present invention is not limited thereto (1-1)
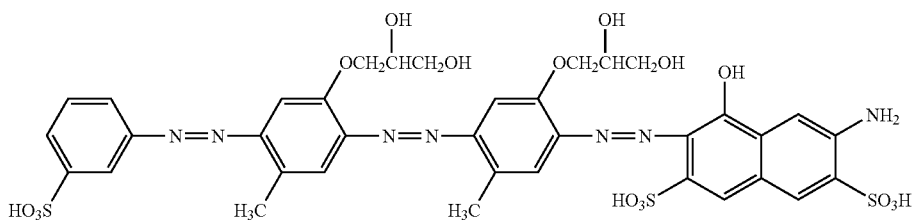

(1-2)
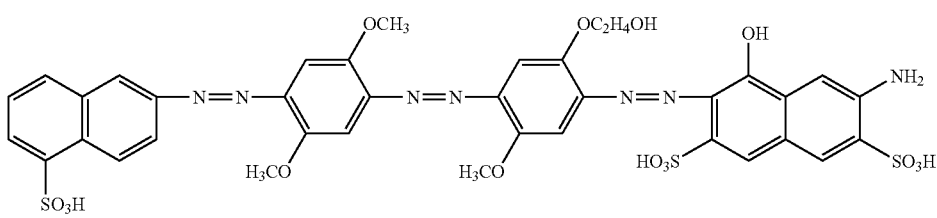

(1-3)
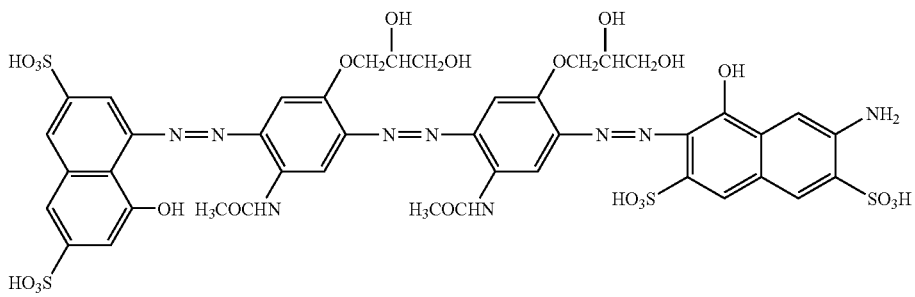

(1-4)
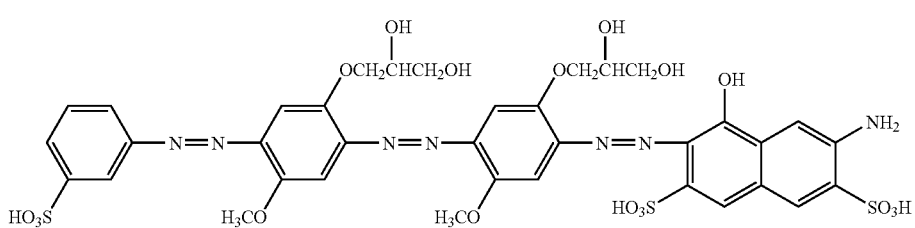

(1-5)
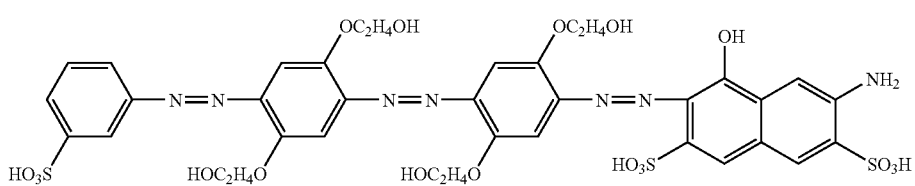

(1-6)
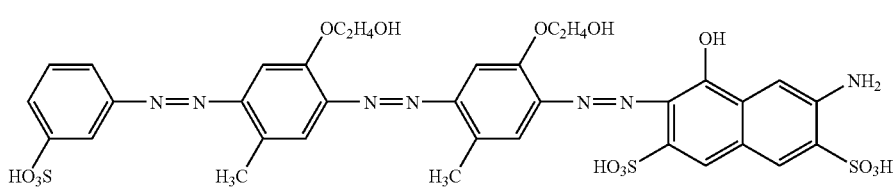

-continued
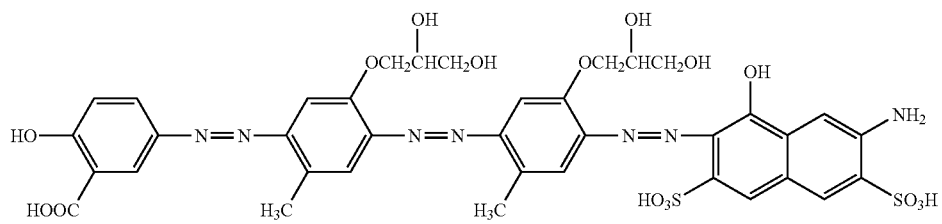
(1-7)
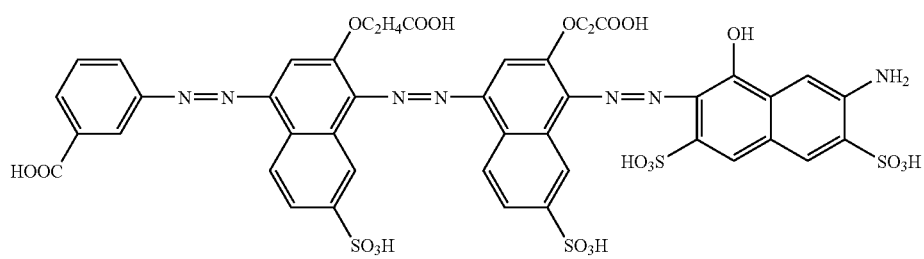
(1-8)
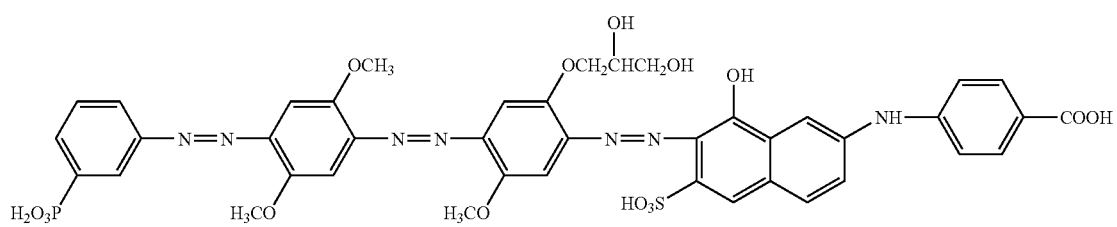
(1-9)
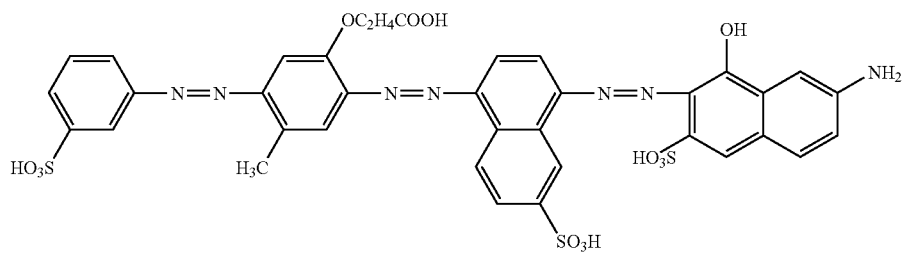
(1-10)
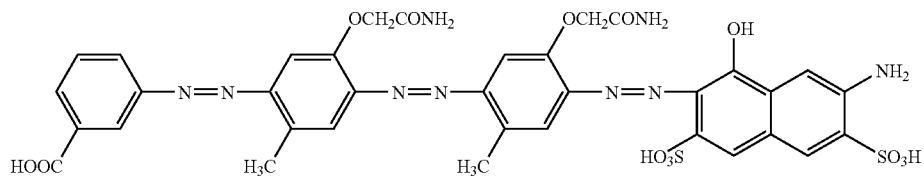
(1-11)
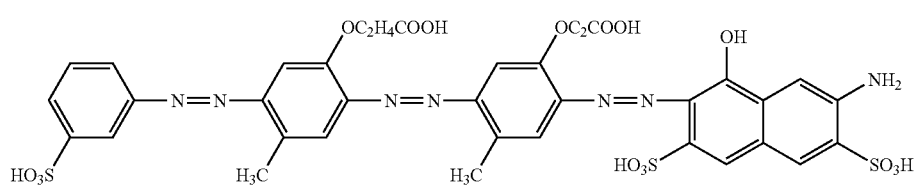
(1-12)
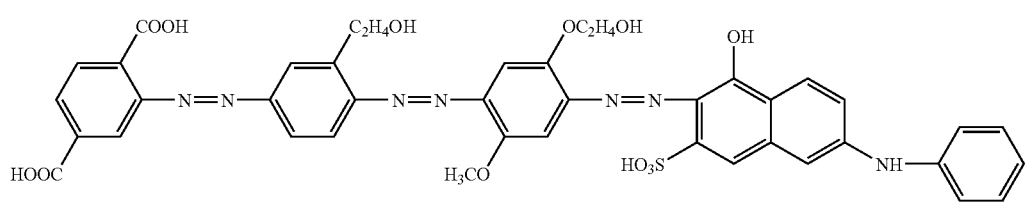
(1-13)

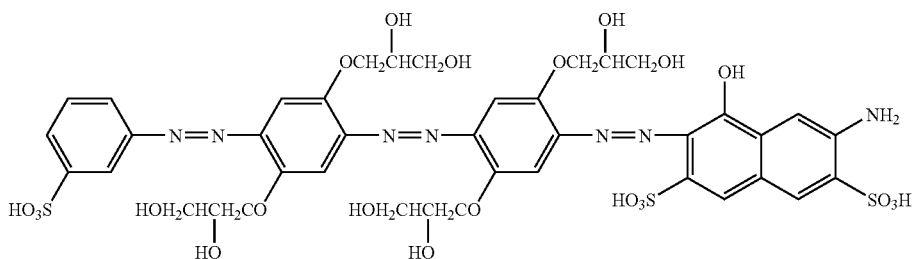
(1-14)
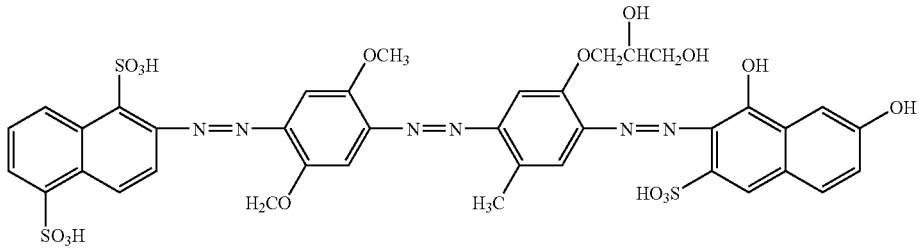
(1-15)
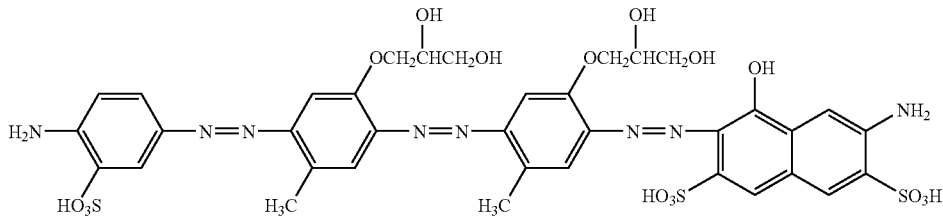
(1-16)
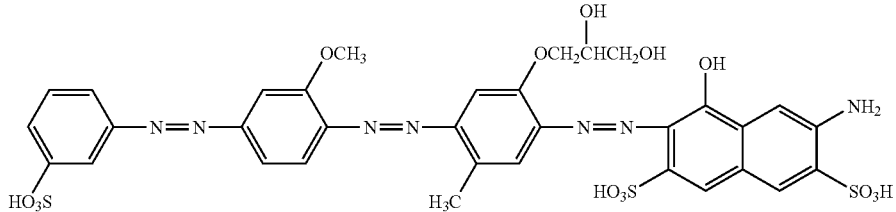
(1-17)
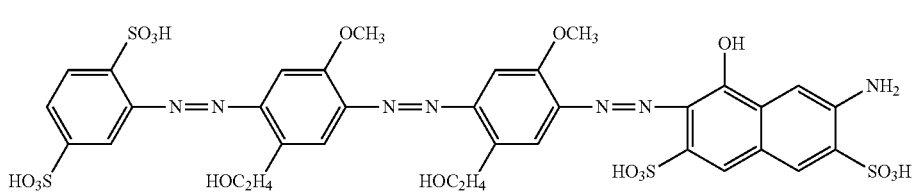
(1-18)
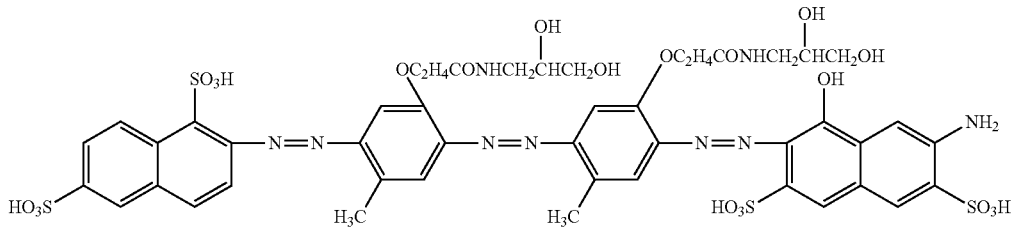
(1-19)
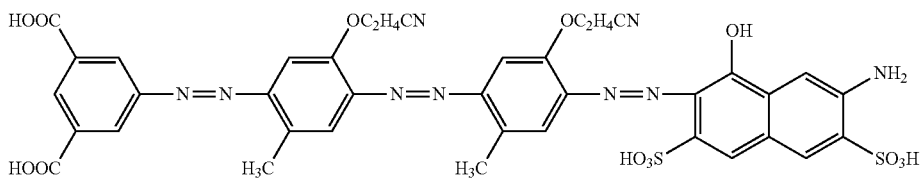
(1-20)

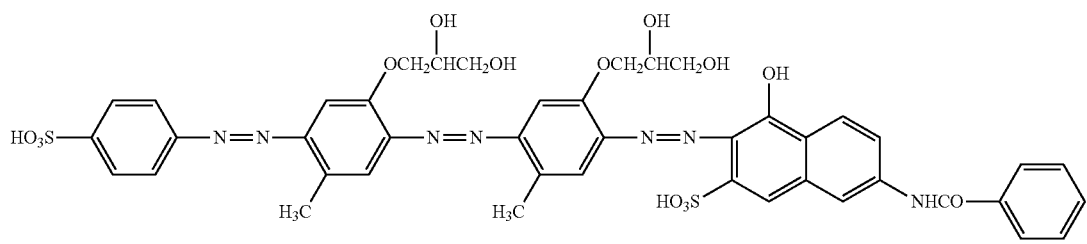

(1-21)

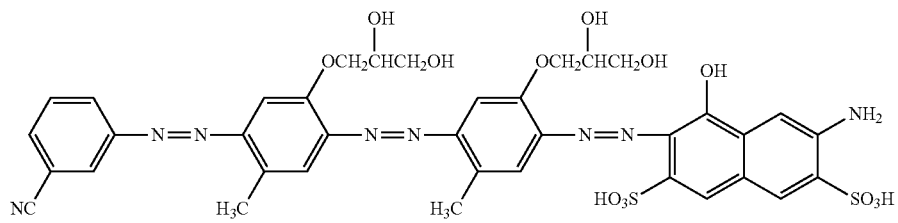

(1-22)

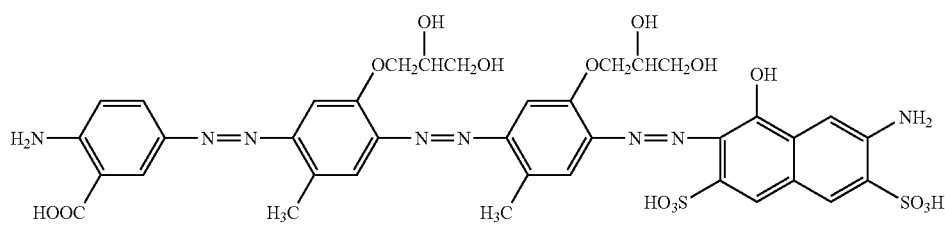

(1-23)

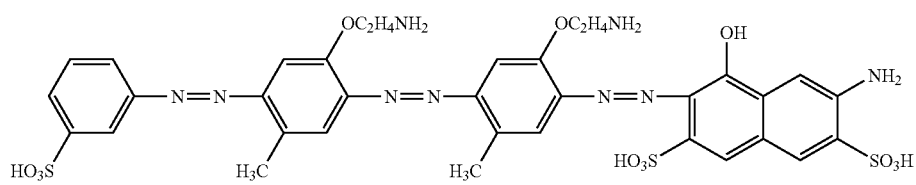

(1-24)

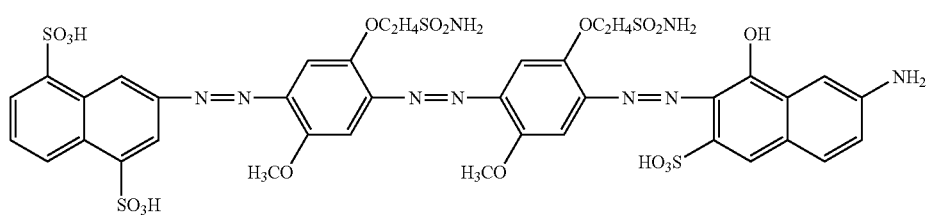

(1-25)

The trisazo dyes represented by the above formula (1) can be produced in accordance with a conventional method. For example, the dye No. (1-1) can be produced by the following steps (A) to (D).

Step (A) From 3-aminobenzenesulfonic acid (metanilic acid) and a compound of the following formula (i), a monoazo compound is produced by means of diazotization and coupling steps in accordance with a common method (e.g. "New Dye Chemistry" edited by Yutaka Hosoda, published by GIHODO SHUPPAN Co., Ltd. on Dec. 21, 1973, p. 396-409):

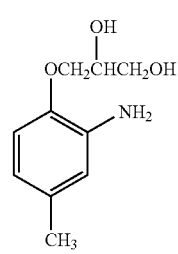

(i)

Step (B): The monoazo compound obtained in Step (A) is likewise diazotized by a common method, followed by a coupling reaction with the compound of the above formula (i) to obtain a disazo compound.

Step (C): The disazo compound obtained in Step (B) is likewise diazotized by a common method, followed by a coupling reaction by a 7-amino-1-naphthol-3,6-disulfonic acid (RR acid) to obtain a trisazo compound.

Step (D): After completion of the reaction in Step (C), salting out with sodium chloride is carried out to obtained the desired dye No. (1-1). The dye may further be purified as the case requires.

The dye represented by the formula (1) of the present invention is useful as a dye for an anisotropic dye film and is suitable for an anisotropic dye film to be formed by a wet system film-forming method. Particularly the dye of the present invention represented by the above structural formula No. (1-1) forms lyotropic liquid crystals in an aqueous solution, and accordingly an anisotropic dye film showing high dichroism can be prepared with it, and it is a dye particularly suitable for the wet system film-forming method.

The wet system film-forming method is usually a process comprising a step of disposing a composition containing a dye and a liquid medium on a substrate and a step of removing the liquid medium and orienting the dye on the substrate, wherein operation conditions in each step are suitably controlled for orientation by e.g. the intermolecular interaction of dye molecules. Accordingly, as different from the above-described process of orienting the film by a stretching treatment, the dye is required to have lyotropic liquid crystal properties by self-assembly. Thus, a dye to be used for a polarizing film prepared by means of the stretching treatment is not necessarily applicable to the wet system film-forming method.

The dye for an anisotropic dye film represented by the formula (1) of the present invention shows high dichroism and has a high degree of orientation, and is suitable particularly for production of an anisotropic dye film by the wet system film-forming method. A composition for an anisotropic dye film containing the dye usually contains the dye represented by the above formula (1) and a solvent. Hereinafter, dyes represented by the above formula (1) will be comprehensively referred to as the dye of the present invention.

The dye of the present invention may be used alone in the composition for an anisotropic dye film, or a plurality of the dyes or a mixture with another dye to the extent of not decreasing the orientation may be used, whereby anisotropic dye films having various chromaticnesses can be produced. Further, in the composition for an anisotropic dye film of the present invention in addition to a solvent, an additive such as a surfactant may be blended if necessary.

Another dye for blending may, for example, be preferably C.I. Direct Yellow 12, C.I. Direct Yellow 34, C.I. Direct Yellow 86, C.I. Direct Yellow 142, C.I. Direct Yellow 132, C.I. Acid Yellow 25, C.I. Direct Orange 39, C.I. Direct Orange 72, C.I. Direct Orange 79, C.I. Acid Orange 28, C.I. Direct Red 39, C.I. Direct Red 79, C.I. Direct Red 81, C.I. Direct Red 83, C.I. Direct Red 89, C.I. Acid Red 37, C.I. Direct Violet 9, C.I. Direct Violet 35, C.I. Direct Violet 48, C.I. Direct Violet 57, C.I. Direct Blue 1, C.I. Direct Blue 67, C.I. Direct Blue 83, C.I. Direct Blue 90. C.I. Direct Green 42, C.I. Direct Green 51 or C.I. Direct Green 59.

As the solvent to be used for the composition for an anisotropic dye film of the present invention, water, a water-miscible organic solvent or a mixture thereof is suitable. Specifically, the organic solvent may, for example, be an alcohol such as methyl alcohol, ethyl alcohol or isopropyl alcohol, a glycol such as ethylene glycol or diethylene glycol or a cellosolve such as methyl cellosolve or ethyl cellosolve. They may be used alone or as a solvent mixture of two or more of them.

In a case where the dye of the present invention is dissolved or dispersed in a solvent, the dye concentration depends on the solubility of the dye and the concentration of formation of an association state such as a lyotropic liquid crystalline state, and it is preferably at least 0.1 wt %, more preferably at least 0.5 wt %, and preferably at most 30 wt %, more preferably at most 20 wt %.

In a case where the composition for anisotropic dye film is applied as e.g. a dye solution to a substrate, in order to improve wettability and the coating properties on the substrate, an additive such as a surfactant may be added as the case requires. As the surfactant, any of anionic cationic and nonionic surfactants may be used. The addition concentration is usually preferably at least 0.05 wt % and at most 0.5 wt %.

Further, the present invention relates to an anisotropic dye film formed by using the above composition for an anisotropic dye film and an anisotropic dye film containing the dye for an anisotropic dye film of the present invention. As mentioned above, the trisazo dye represented by the formula (1) of the present invention, which has a specific dye structure, usually forms a highly lyotropic liquid crystalline state, provides a high degree of molecular orientation state and shows high dichroism. Accordingly the anisotropic dye film of the present invention using such a dye is a useful dye film showing high dichroism.

The anisotropic dye film of the present invention has a high dichroic ratio, and preferred is one having a dichroic ratio of at least 5 more preferably at least 12, and one having a dichroic ratio of at least 15 is particularly useful.

The anisotropic dye film to be formed by using the dye of the present invention is preferably prepared by a wet system film-forming method. As the wet system film-forming method usually a known method is suitably applied, such as a method of preparing a composition containing the dye of the present invention such as a dye solution, applying the composition to a substrate such as a glass plate and orienting the dye, followed by lamination.

The wet system film-forming method may, for example, be coating systems as disclosed in "Coating Systems", Yuji Harasaki (Maki Shoten, published on Oct. 30, 1979, pages 3 (Tables 1 and 2) and 6 to 154) or a known method as disclosed in "Creation and Applications of Harmonized Molecular Materials" supervised by Kunihiro Ichimura (CMC Publishing Co., Ltd., published on Mar. 3, 1998, pages 118 to 149). Further, a method of coating a substrate preliminarily subjected to an orientation treatment with a composition for an anisotropic dye film containing a dye e.g. by spin coating, spray coating, bar coating, roll coating or blade coating may be mentioned.

At the time of coating the substrate, the temperature is preferably at least 0° C. and at most 80° C., and the humidity is preferably at least about 10% RH and at most about 80% RH. At the time of drying, the temperature is preferably at least 0° C. and at most 120° C., and the humidity is preferably at least about 10% RH and at most about 80% RH.

In a case where the anisotropic dye film is to be formed on a substrate by e.g. the above method the film thickness after drying is usually preferably at least 50 nm, more preferably at least 100 nm and preferably at most 50 μm, more preferably at most 1 μm.

As the substrate to be used for formation of the anisotropic dye film of the present invention, glass or a resin film of e.g. triacetate, an acrylic resin, a polyester, triacetyl cellulose or an urethane polymer may, for example, be mentioned. Further, on the surface of such a substrate, an orientation treatment layer may be applied by a known method as disclosed in e.g. "Ekisho Binran (Liquid Crystal Handbook)" (Maruzen Company, Limited, published on Oct. 30, 2000, pages 226 to 239) in order to control the orientation direction of the dye of the present invention. Particularly, the dye of the present invention which has an alkyl group or alkoxy group substituted by a hydrogen bond-forming group, has favorable affinity for the surface of the substrate. Thus, preferred is a substrate employing for its surface a resin film (particularly preferably one containing oxygen atoms or nitrogen atoms having a lone pair of electrons (n electrons)).

The anisotropic dye film of the dye to be formed by coating by the above method usually has low mechanical strength, and thus a protective layer is provided if necessary. The protective layer is formed by lamination of a transparent polymer film such as a triacetate, acrylic resin, polyester, polyimide, triacetyl cellulose or urethane polymer film, and then subjected to practical use.

Further in a case where the anisotropic dye film of the present invention is used as e.g. a polarizing filter for various display devices such as LCD or OLED, the anisotropic dye film may be formed directly on e.g. an electrode substrate constituting such a display device, or a base material having the dye film formed thereon may be used as a constituting component of such a display device.

The anisotropic dye film of the present invention will function as a polarizing film whereby a linearly polarized light, circularly polarized light or oval polarized light can be obtained by utilizing the anisotropy in light absorption and further is capable of providing functions as various anisotropic films such as refractive anisotropy and conductivity anisotropy by selecting the film-forming process and the substrate or the composition for an anisotropic dye film containing the dye, whereby it can be made various types of polarizing elements which can be used for various purposes.

The polarizing element of the present invention is one employing the above-described anisotropic dye film of the present invention. It may be either a polarizing element comprising the anisotropic dye film alone or a polarizing element having the anisotropic dye film formed on a substrate. The polarizing element having the anisotropic dye film formed on a substrate will be called a polarizing element including the substrate.

In a case where the anisotropic dye film of the present invention is formed on a substrate and used as a polarizing element, the formed anisotropic dye film itself may be used, or not only the above-mentioned protective layer but also layers having various functions such as an adhesive layer and a reflection-preventing layer, an oriented film, and layers having optical functions such as a function as a phase difference film a function as a brightness-improved film, a function as a reflective film a function as a semi-transmissive reflective film and a function as a diffusion film may be formed by lamination by e.g. a wet system film-forming method, so that it may be used in the form of a laminate.

Such layers having optical functions may be formed, for example, by the following methods.

A layer having a function as a phase difference film may be formed by applying a stretching treatment as disclosed in e.g. Japanese Patent No. 2841377 or Japanese Patent No. 3094113, or by applying a treatment as disclosed in e.g. Japanese Patent No. 3168850.

Further, a layer having a function as a brightness-improved film may be formed by forming ultrafine pores by a method as disclosed in e.g. JP-A-2002-169025 or JP-A-2003-29030, or by superposing two or more cholesteric liquid crystal layers with different central wavelengths of the selective reflection.

A layer having a function as a reflective film or a semi-transmissive reflective film may be formed by using a metal thin film obtained by deposition or spattering.

A layer having a function as a diffusion film may be formed by coating the above protective layer with a resin solution containing fine particles.

Further, a layer having a function as a phase difference film or an optical compensation film may be formed by applying a liquid crystalline compound such as a discotic liquid crystalline compound or a nematic liquid crystalline compound and orienting it.

The anisotropic dye film using the dye according to the present invention can be formed directly on a highly heat resistant substrate such as glass, whereby a highly heat resistant polarizing element can be obtained. Thus, it is useful not only for a liquid crystal display and an organic EL display but also for applications for which high heat resistance is required, such as a liquid crystal projector and an on-vehicle display panel.

EXAMPLES

Now, the present invention will be described in further detail with reference to Examples. However, it should be understood that the present invention is by no means restricted to such specific Examples within a range not to exceed the scope of the present invention.

In the following Examples, the dichroic ratio was obtained by measuring the transmittance of an anisotropic dye film by a spectrophotometer having an iodine type polarizing element disposed in an incident optical system, followed by calculation in accordance with the following formula:

Dichroic ratio $(D)=Az/Ay$ $Az=-\log(Tz)$ $Ay=-\log(Ty)$

Tz: transmittance of a dye film for a polarized light in the absorption axis direction Ty: transmittance of a dye film for a polarized light in the polarization axis direction Example 1

13 parts of sodium salt of the above dye No. (1-1) as a dye was added to 87 parts of water, stirred and dissolved, followed by filtration to obtain a dye aqueous solution (composition for an anisotropic dye film).

On the other hand, as a substrate, a glass substrate having a polyimide oriented film formed thereon by applying a polyamic acid derivative by silk printing, followed by baking and rubbing (75 mm×25 mm, thickness 1.1 mm, the polyimide oriented film with a polyimide film thickness of about 800 Å preliminarily subjected to rubbing treatment with cotton cloth) was prepared. The above dye aqueous solution was applied on the substrate by Mayer rods (manufactured by RD SPECIALTIES, No. 2) and air dried to obtain an anisotropic dye film in which the dye was oriented in the rubbing direction.

Figure 2:
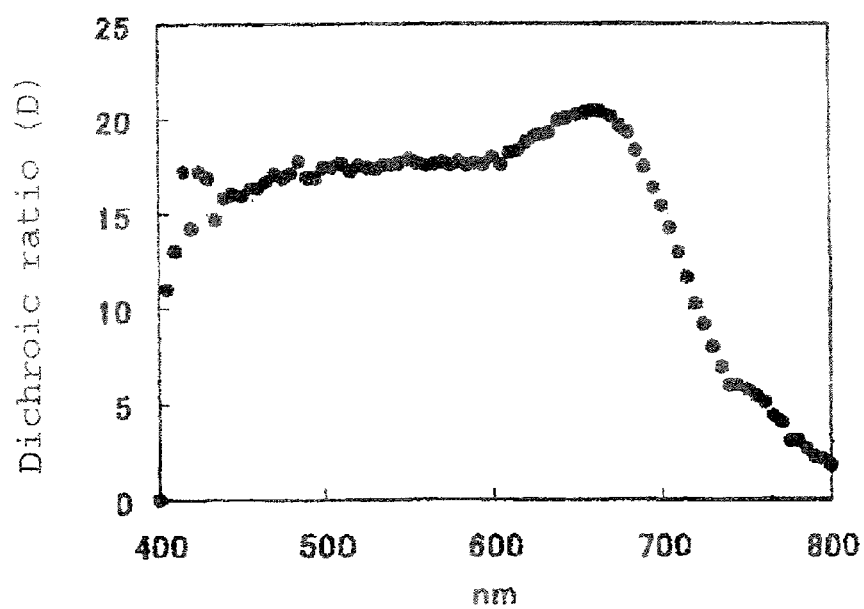
FIG. 2 shows a dichroic ratio (D) of an anisotropic dye film in Example 1 at each wavelength.

The transmittance (Tz) of the obtained anisotropic dye film for a polarized light having a plane of vibration in the absorption axis direction in the plane of the dye film and the transmittance (Ty) for a polarized light having a plane of vibration in the polarization axis direction in the plane of the dye film were measured and shown in FIG. 1. Further, the dichroic ratio (D) at each wavelength is shown in FIG. 2. The dye film of the present invention had a substantially constant high dichroic ratio (light absorption anisotropy) in a wide wavelength region of from about 400 nm to about 600 nm and had excellent optical characteristics as a polarizing film.

Example 2

Figure 3:
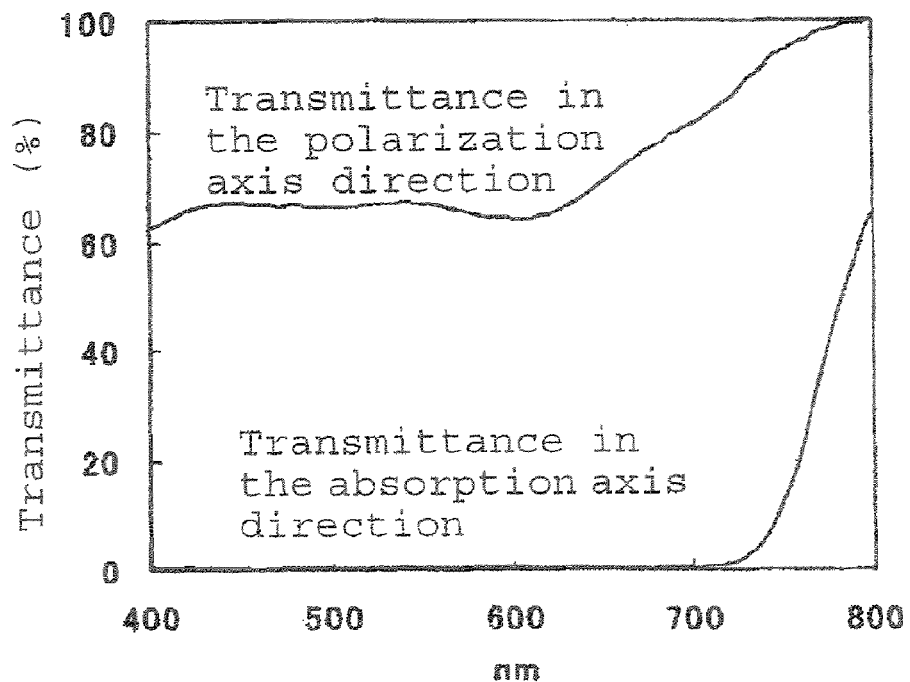
FIG. 3 shows the transmittance (Tz) of an anisotropic dye film in Example 2 for a polarized light in the absorption axis direction and the transmittance (Ty) for a polarized light in the polarization axis direction in the plane of the film.
Figure 4:
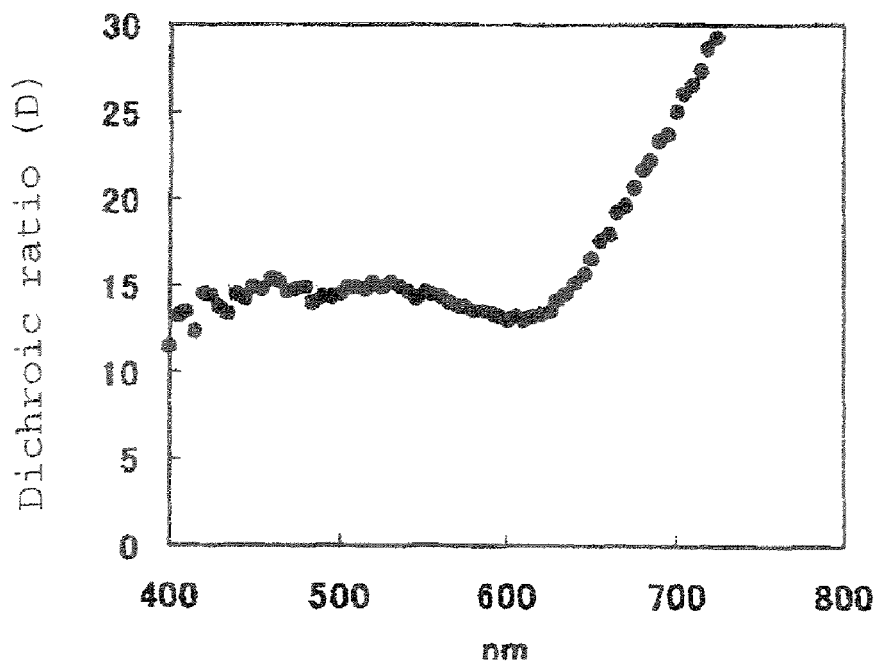
FIG. 4 shows a dichroic ratio (D) of an anisotropic dye film in Example 2 at each wavelength.

32 parts of sodium salt of the above dye No. (1-4) was added to 68 parts of water, stirred and dissolved followed by filtration to obtain a dye aqueous solution (composition for an anisotropic dye film). The composition was applied to the same substrate subjected to orientation treatment as one used in Example 1 with a four-sided applicator with a gap of 2 μm (manufactured by Imoto Machinery Co., Ltd.) and air dried to obtain an anisotropic dye film. The transmittance (Tz) of the obtained anisotropic dye film for a polarized light having a plane of vibration in the absorption axis direction and the transmittance (Ty) for a polarized light having a plane of vibration in the polarization axis direction in the plane of the dye film were measured and shown in FIG. 3. Further, the dichroic ratio (D) in each wavelength is shown in FIG. 4. The dye film of the present invention had a substantially constant high dichroic ratio (light absorption anisotropy) in a wide wavelength region of from about 400 nm to about 600 nm and had excellent optical characteristics as a polarizing film.

Example 3

Figure 5:
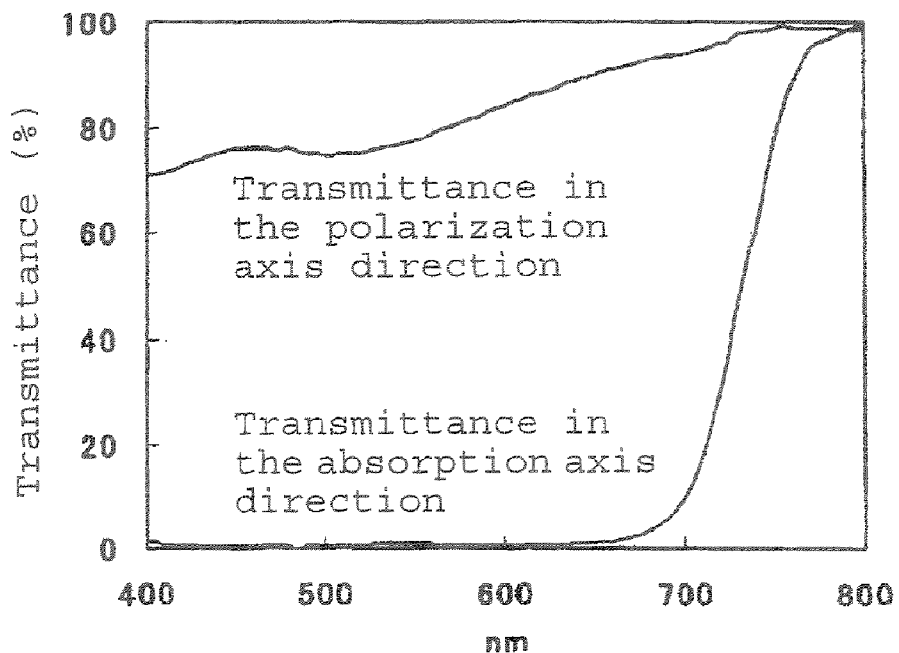
FIG. 5 shows the transmittance (Tz) of an anisotropic dye film in Example 3 for a polarized light in the absorption axis direction and the transmittance (Ty) for a polarized light in the polarization axis direction in the plane of the film.
Figure 6:
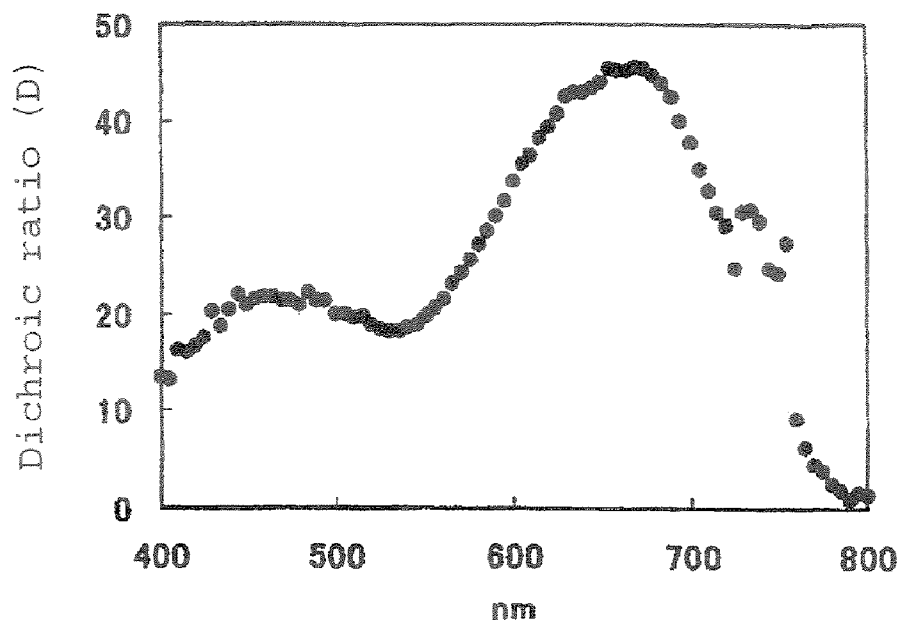
FIG. 6 shows a dichroic ratio (D) of an anisotropic dye film in Example 3 at each wavelength.

15 parts of sodium salt of the above dye No. (1-7) was added to 85 parts of water, stirred and dissolved followed by filtration to obtain a dye aqueous solution (composition for an anisotropic dye film). The composition was applied to the same substrate subjected to orientation treatment as one used in Example 1 with a four-sided applicator with a gap of 10 μm (manufactured by Imoto Machinery Co., Ltd.) and air dried to obtain an anisotropic dye film. The transmittance (Tz) of the obtained anisotropic dye film for a polarized light having a plane of vibration in the absorption axis direction and the transmittance (Ty) for a polarized light having a plane of vibration in the polarization axis direction in the plane of the dye film were measured and shown in FIG. 5. Further, the dichroic ratio (D) in each wavelength is shown in FIG. 6. The dye film in this Example showed high dichroism in a region of from 550 nm to 700 nm and had excellent optical characteristics as a polarizing film.

Example 4

Figure 7:
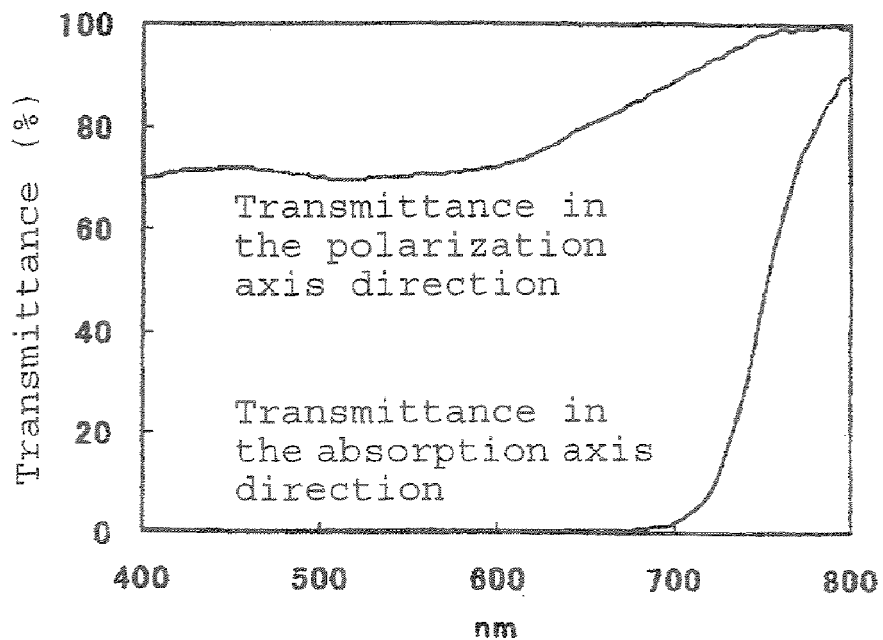
FIG. 7 shows the transmittance (Tz) of an anisotropic dye film in Example 4 for a polarized light in the absorption axis direction and the transmittance (Ty) for a polarized light in the polarization axis direction in the plane of the film.
Figure 8:
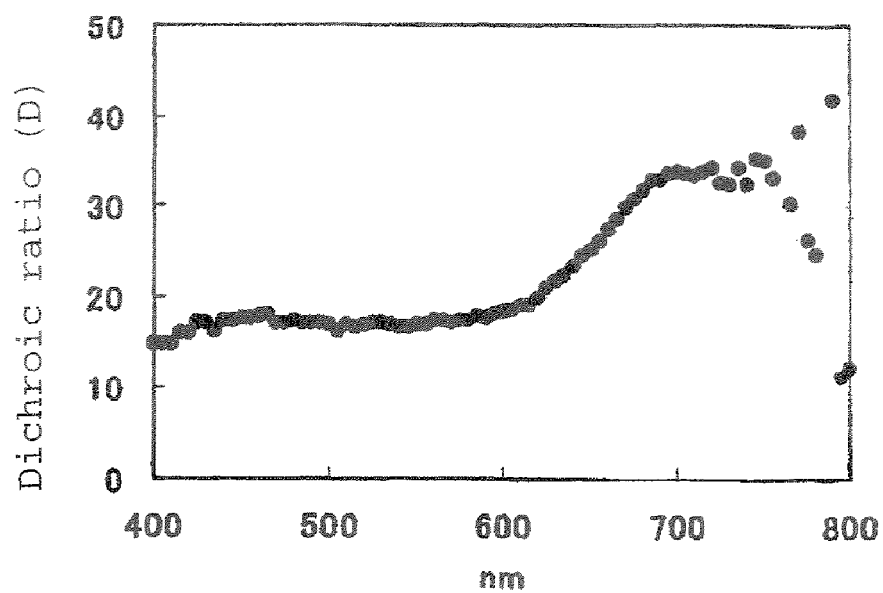
FIG. 8 shows a dichroic ratio (D) of an anisotropic dye film in Example 4 at each wavelength.

20 parts of sodium salt of the above dye No. (1-16) was added to 80 parts of water, stirred and dissolved followed by filtration to obtain a dye aqueous solution (composition for an anisotropic dye film). The composition was applied to the same substrate subjected to orientation treatment as one used in Example 1 in the same manner as in Example 3 and air dried to obtain an anisotropic dye film. The transmittance (Tz) of the obtained anisotropic dye film for a polarized light having a plane of vibration in the absorption axis direction and the transmittance (Ty) for a polarized light having a plane of vibration in the polarization axis direction in the plane of the dye film were measured and shown in FIG. 7. Further, the dichroic ratio (D) in each wavelength is shown in FIG. 8. The dye film in this Example had a substantially constant high dichroic ratio (light absorption anisotropy) in a wide wavelength region of from about 400 nm to about 600 nm and had excellent optical characteristics as a polarizing film.

Example 5

Figure 9:
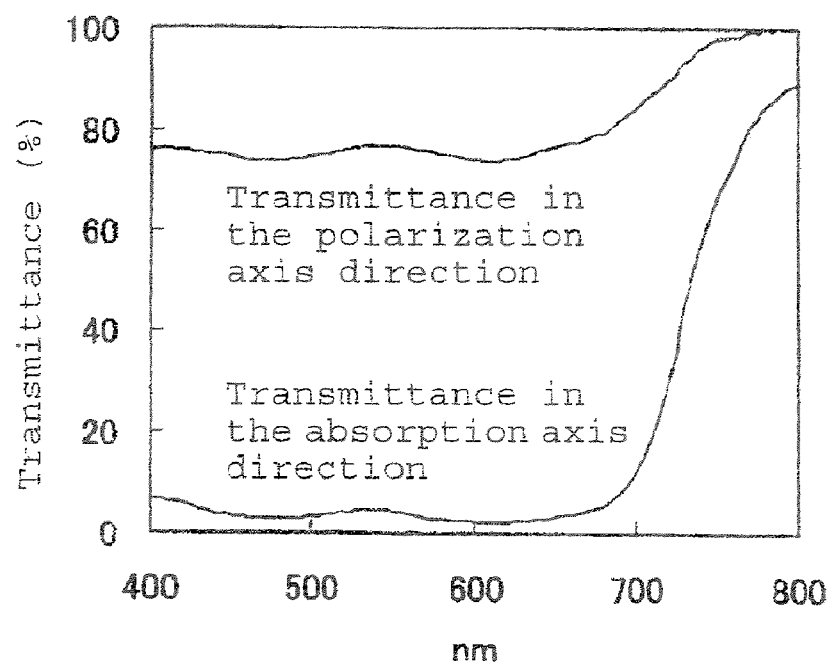
FIG. 9 shows the transmittance (Tz) of an anisotropic dye film in Example 5 for a polarized light in the absorption axis direction and the transmittance (Ty) for a polarized light in the polarization axis direction in the plane of the film.
Figure 10:
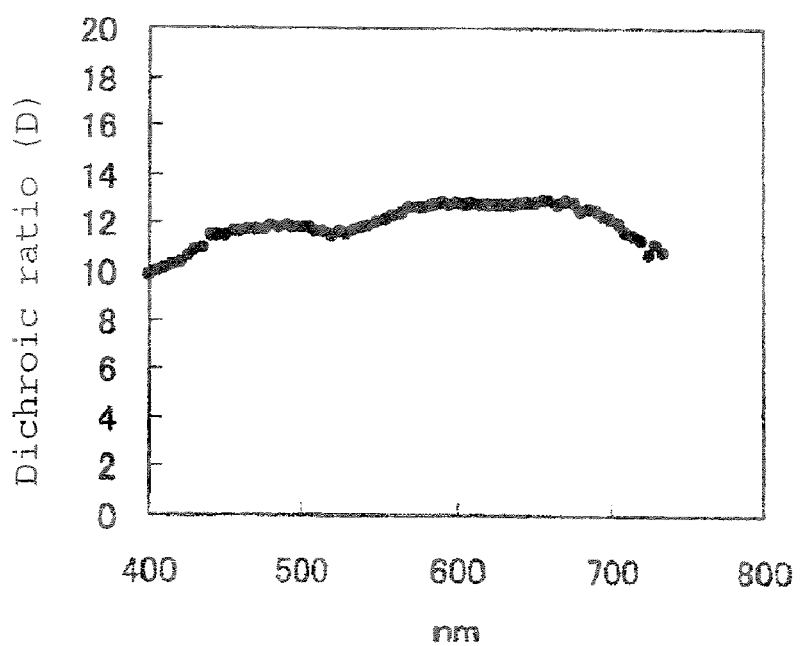
FIG. 10 shows a dichroic ratio (D) of an anisotropic dye film in Example 5 at each wavelength.

7 parts of sodium salt of the above dye No. (1-22) was added to 93 parts of water, stirred and dissolved, followed by filtration to obtain a dye aqueous solution (composition for an anisotropic dye film). The composition was applied to the same substrate subjected to orientation treatment as one used in Example 1 in the same manner as in Example 3 and air dried to obtain an anisotropic dye film. The transmittance (Tz) of the obtained anisotropic dye film for a polarized light having a plane of vibration in the absorption axis direction and the transmittance (Ty) for a polarized light having a plane of vibration in the polarization axis direction in the plane of the dye film were measured and shown in FIG. 9. Further, the dichroic ratio (D) in each wavelength is shown in FIG. 10. The dye film in this Example had a substantially constant high dichroic ratio (light absorption anisotropy) in a wide wavelength region of from about 400 nm to about 600 nm and had excellent optical characteristics as a polarizing film.

Example 6

Figure 13:
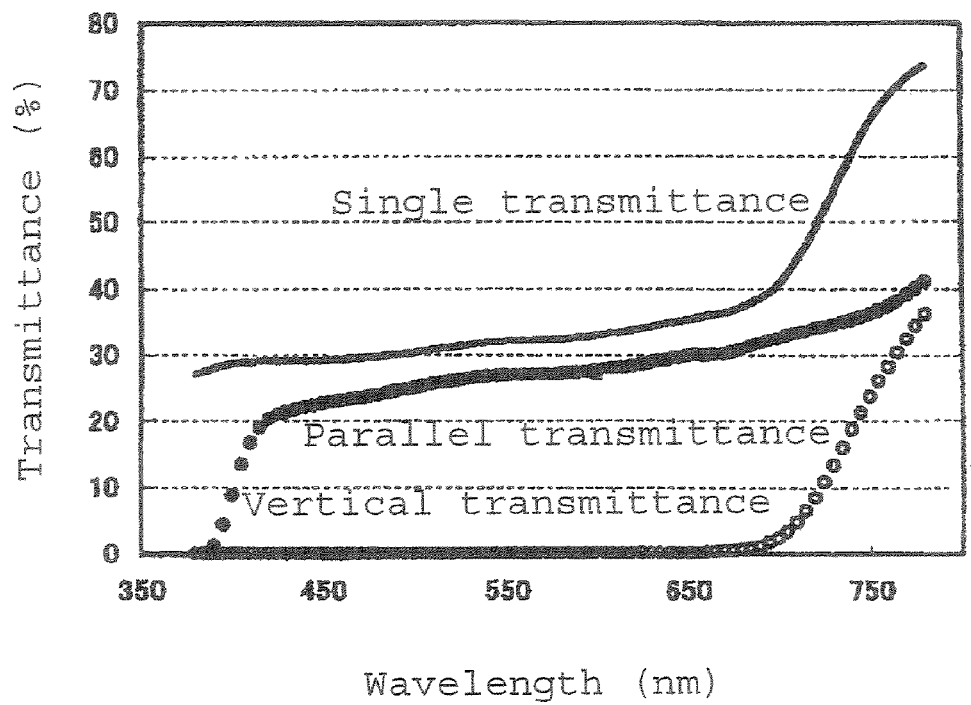
FIG. 13 shows the single transmittance, the parallel transmittance and the vertical transmittance of an anisotropic dye film in Example 6.

A polyethylene terephthalate (PET) film with a thickness of 100 μm (O300E manufactured by MITSUBISHI POLYESTER FILM CORPORATION) subjected to a pre-washing treatment by being immersed in ultrapure water having a resistivity of 18.2 MΩ·cm and acetone in this order, followed by air drying was subjected to a rubbing treatment with nylon cloth, and the dye aqueous solution (composition for an anisotropic dye film) as described in Example 1 was applied by Mayer rods manufactured by RD SPECIALTIES, No. 2) and air dried to obtain anisotropic dye films. The transmittance of one obtained film for natural light was measured as a single transmittance. Further, the transmittance of two films superposed each other so that the dye-coated faces were in contact with each other and that the absorption axes of the respective anisotropic dye films were in parallel with each other, was measured as a parallel transmittance, and the transmittance of the two films when the absorption axes of the respective anisotropic dye films were at right angles (vertical to each other) was measured as a vertical transmittance. The transmittances under these three conditions are shown in FIG. 13. The anisotropic dye film in this Example showed high dichroism of at least 10 in a wide wavelength range of from 450 nm to 650 nm and had excellent optical characteristics as a polarizing film.

Comparative Example 1

A dye aqueous solution was prepared and an anisotropic dye film was produced in the same manner as in Example 1 except that a dye having the following structural formula was used instead of the above dye No. (1-1)

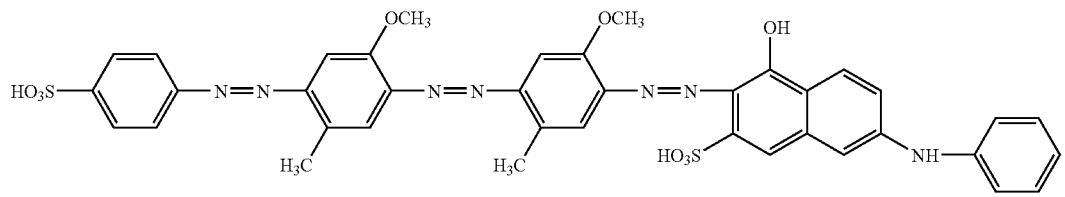

Figure 11:
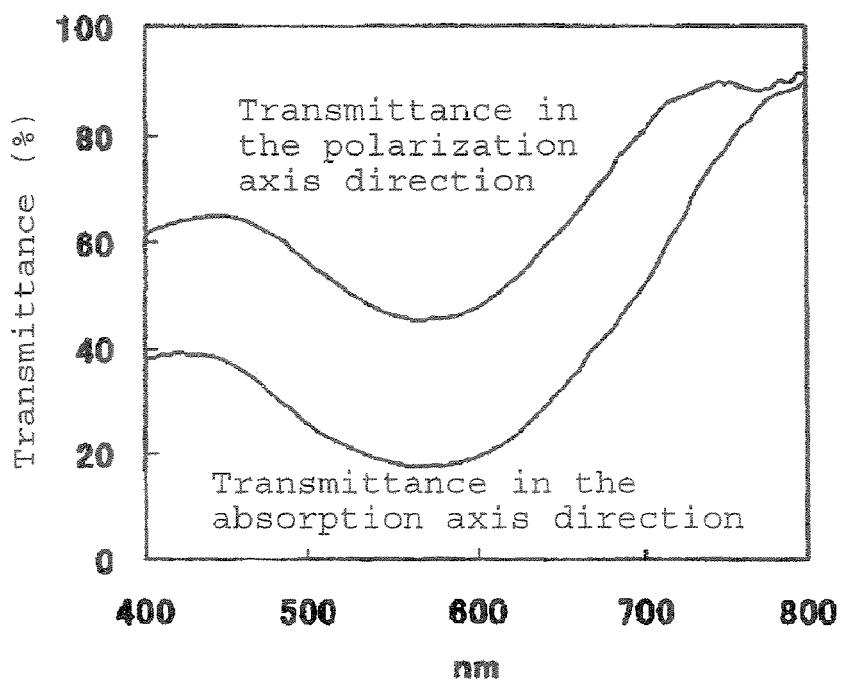
FIG. 11 shows the transmittance (Tz) of an anisotropic dye film in Comparative Example 1 for a polarized light in the absorption axis direction and the transmittance (Ty) for a polarized light in the polarization axis direction in the plane of the film.
Figure 12:
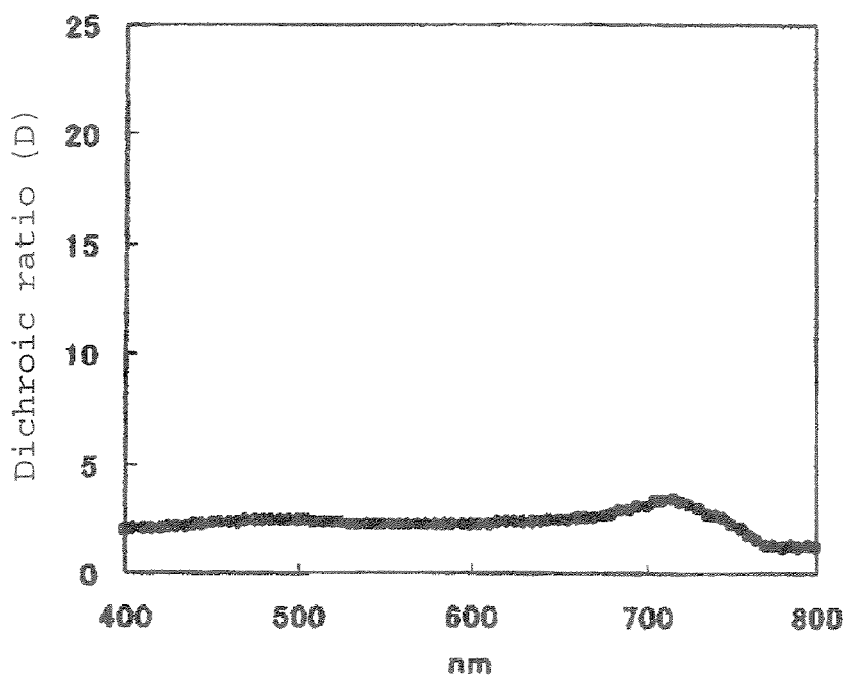
FIG. 12 shows a dichroic ratio (D) of an anisotropic dye film in Comparative Example 1 at each wavelength.

The transmittance (Tz) of the obtained anisotropic dye film for a polarized light having a plane of vibration in the absorption axis direction in the plane of the dye film and the transmittance (Ty) for a polarized light having a plane of vibration in the polarization axis direction in the plane of the dye film were measured and shown in FIG. 11. Further the dichroic ratio (D) at each wavelength is shown in FIG. 12. The obtained dye film had a maximum absorption wavelength of 585 nm and a dichroic ratio of 3.

INDUSTRIAL APPLICABILITY

A trisazo dye capable of forming an anisotropic dye film showing high dichroism and having a high degree of molecular orientation (order parameter) can be provided.

It can be utilized for e.g. a polarizing plate provided on display devices such as light control devices, liquid crystal devices and organic electroluminescence devices.

The entire disclosures of Japanese Patent Application No. 2004-364469 filed on Dec. 16, 2004 and Japanese Patent Application No. 2005-338108 filed on Nov. 24, 2005 including specifications claims, drawings and summaries are incorporated herein by reference in their entireties.

The invention claimed is:

1. A trisazo dye, of which the free acid form is represented by the following formula (1), wherein at least one of the groups represented by $B^1$ and $D^1$ has at least one substituent as defined by Q1, which is an alkyl group or alkoxy group substituted by a hydrogen bond-forming group:

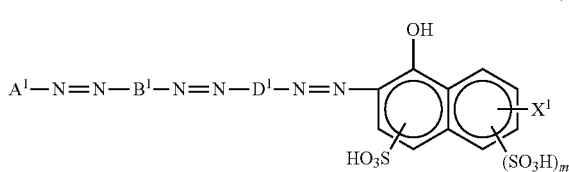

(1)

wherein $A^1$ is a phenyl group or naphthyl group which may be substituted, each of $B^1$ and $D^1$ which are independent of each other, is a phenylene group or naphthylene group which may be substituted, and may have a substituent other than Q1, $X^1$ is an amino group which may be substituted or a hydroxyl group, and is located at the 6- or 7-position on the terminal naphthyl group, and m is 0 or 1, and wherein at least one of the following (1), (2) and (3) applies:

(1) in the formula (1), each of $B^1$ and $D^1$ which are independent of each other, is a group represented by the following formula (a) or (b):

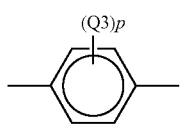

(a)

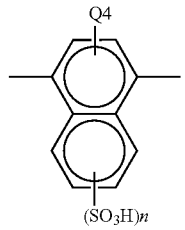

(b)

wherein each of Q3 and Q4 which are independent of each other, is a substituent as defined by the above Q1, p is 1 or 2, and n is 0 or 1, (2) in the above formula (1), $A^1$ is a group represented by the following formula (c):

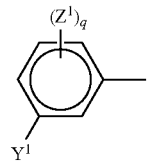

(c)

wherein $Y^1$ is a sulfo group, a carboxy group or a phosphoric acid group, $Z^1$ is a halogen atom, a hydroxyl group, a nitro group, a cyano group, an amino group which may be substituted, a $C_{1-4}$ alkyl group which may be substituted, a $C_{1-4}$ alkoxy group which may be substituted, a sulfo group or a carboxy group, and q is 0 or 1, and (3) $X^1$ is a hydroxyl group.

2. The trisazo dye according to claim 1, wherein in formula (1), Q1 is an alkyl group or alkoxy group substituted by a —OH group, a —COOH group, a —$NR^1R^2$ group, a —$SO_2NR^3R^4$ group or a —$CONR^5R^6$ group, wherein each of $R^1$ to $R^6$ which are independent of one another, is a hydrogen atom or a $C_{1-6}$ alkyl group which may be substituted.

3. The trisazo dye according to claim 1, wherein in formula (1), each of $B^1$ and $D^1$ which are independent of each other, is a group represented by the following formula (a) or (b):

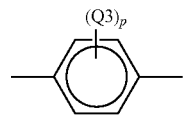

(a)

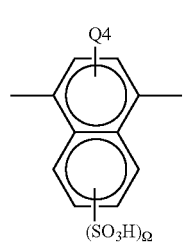

(b)

wherein each of Q3 and Q4 which are independent of each other, is a substituent as defined by Q1, p is 1 or 2, and n is 0 or 1.

4. The trisazo dye according to claim 1, wherein in formula (1), $A^1$ is a group represented by the following formula (c):

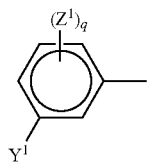
(c)

wherein $Y^1$ is a sulfo group, a carboxy group or a phosphoric acid group, $Z^1$ is a halogen atom, a hydroxyl group, a nitro group, a cyano group, an amino group which may be substituted, a $C_{1-4}$ alkyl group which may be substituted, a $C_{1-4}$ alkoxy group which may be substituted, a sulfo group or a carboxy group, and q is 0 or 1.

5. A composition for an anisotropic dye film, which comprises the trisazo dye as defined in claim 1 and a solvent.

6. An anisotropic dye film, which comprises the trisazo dye as defined in claim 1.

7. A polarizing element comprising the anisotropic dye film as defined in claim 6.

8. The trisazo dye according to claim 1, wherein $X^1$ is an amino group which may be substituted.

9. The trisazo dye according to claim 1, wherein $X^1$ is a hydroxyl group.

* * * * *